UNITED STATES PATENT OFFICE.

R. B. WEESE, OF CHARLOTTESVILLE, INDIANA.

IMPROVED MEDICINE.

Specification forming part of Letters Patent No. 42,890, dated May 24, 1864.

*To all whom it may concern:*

Be it known that I, R. B. WEESE, of Charlottesville, in the county of Hancock and State of Indiana, have invented a new and Improved Remedy for Fits; and I do hereby declare the following to be a full and exact description of the same.

In order that others skilled in the art to which my invention appertains may be enabled to fully understand and use the same, I will proceed to describe it.

The remedy which I employ for the cure of fits consists of the following ingredients, which are used in the proportions named—viz: lady's-slipper, powdered, twelve ounces; queen of the meadow, powdered, twelve ounces; dandelion-root, powdered, one-half ounce; spikenard-root, powdered, one-half ounce; pæonia-root, powdered, one-half ounce; garlic-oil, one ounce; gum-asafetida, powdered, one-half ounce. The above are mixed in one quart of good rye whisky, when the medicine is ready for use. The lady's-slipper is a gentle stimulant to the nervous system, and also a sedative. The queen of the meadow acts as a tonic in inflammatory feeble excitement, and it is peculiarly adapted to obviate the causes of debility. The dandelion-root serves to stimulate the liver and spleen and removes the torpidness of the liver and abdominal viscera. The spikenard-root imparts an agreeable odor to the compound and acts as an aromatic bitters. The pæonia is an anodyne and allays the quivering and distracted nervous system. The garlic-oil is a gentle stimulus, which quickens the circulation and acts as a carminative. The gum-asafetida constitutes both a powerful anti-spasmodic and a laxative.

Having thus described my invention, what I claim as new therein, and desire to secure by Letters Patent, is—

A medicine consisting of the above ingredients, compounded in proportions substantially as specified, as a specific for the treatment of fits.

The above specification of my improved remedy for fits signed this 12th day of April, 1864.

R. B. WEESE.

Witnesses:
   CHAS. D. MORGAN,
   ORANGE R. WEAVER.